United States Patent Office 3,733,374
Patented May 15, 1973

3,733,374
THIOPHOSPHATE ACETYL HYDRAZINES
James Zielinski, Kenilworth, N.J., assignor to Esso Research and Engineering Company
No Drawing. Filed Apr. 24, 1970, Ser. No. 31,762
Int. Cl. C07f 9/16; A01n 9/36
U.S. Cl. 260—923                                    12 Claims

ABSTRACT OF THE DISCLOSURE

Organophosphorus compounds represented by the following structure:

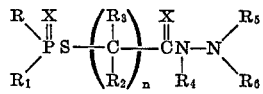

wherein R and $R_1$ may or may not be the same and are selected from the group consisting of $C_1$–$C_6$ alkoxy or alkyl; $C_1$–$C_6$ alkoxyalkyl; phenoxy optionally substituted by halogen, nitro or $C_1$–$C_6$ alkyl; phenylthio optionally substituted by halogen, nitro or $C_1$–$C_6$ alkyl; $C_1$–$C_6$ alkylthio, branched and unbranched; phenyl optionally substituted by halogen, nitro or $C_1$–$C_6$ alkyl; $R_2$, $R_3$ and $R_4$ may or may not be the same and are selected from the group consisting of hydrogen; $C_1$–$C_6$ alkyl, unsubstituted, branched or unbranched or optionally substituted by halogen, $C_1$–$C_6$ alkoxy, $C_1$–$C_6$ alkylthio, $C_1$–$C_6$ alkylthioalkyl, $C_1$–$C_6$ alkoxy alkyl or mono and dialkylaminoalkyl; phenyl optionally substituted by halogen, nitro or $C_1$–$C_6$ alkyl; X is either O or S and $n$ is an integer ranging from 1–3; $R_5$ and $R_6$ may be the same or different and are selected from the group consisting of

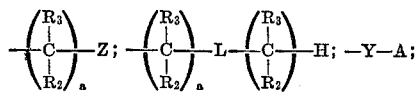

substituted or unsubstituted aryl and heteroaryl; wherein Z=CN, $COOR_2$, $CON(R_2)_2$, $NO_2$, $SO_2N(R_2)_2$, COOH, trihaloalkyl,

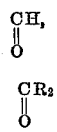

wherein L=O, S, SO, $SO_2$, NH, $NR_2$,

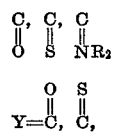

SO, $SO_2$, A=$OR_2$, $SR_2$, $NHR_2$, $N(R_2)_2$ and $a$ is an integer ranging from 1 to 6; with the proviso that when $R_5$ is the same as $R_2$, then $R_6$ cannot be $R_2$ except when $R_5$ or $R_6$ is aryl or heteroaryl.

Such compounds as disclosed in this invention have been found to have contact and systemic insecticidal and miticidal properties.

This invention relates to a new group of thiophosphate derivatives of acetyl hydrazides. In one aspect, this invention relates to novel compounds which exhibit excellent contact and systemic insecticidal and miticidal properties while being relatively safe towards mammals. In another aspect, this invention relates to the use of such compounds as pesticides.

Dialkylthio and dithiophosphoro and phosphono acetyl hydrazides are not novel for they have been described in a Belgian Pat. 713,363, which was published in October of 1968. This patent describes compounds defined by the following structural formula:

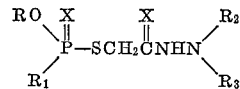

in which R is a lower alkyl radical; $R_1$ is a lower alkyl radical or a lower alkoxy radical; the radicals represented by X are independently selected from the group consisting of oxygen and sulfur; $R_2$ and $R_3$ are independently selected from the group consisting of hydrogen, the methyl, ethyl, formyl, and acetyl radicals, and in combination can be selected from the group consisting of the ethylidene and methylidene radicals. The lower alkyl radicals suitable for R and $R_1$ are aliphatic straight chain and branched chain radicals having from 1 to 8 carbon atoms and include, for example, the methyl, ethyl, n-propyl, isopropyl, amyl, octyl, and analogous radicals. In the same way, the lower alkoxy radicals suitable for $R_1$ are straight chain and branched chain radicals having from 1 to 8 carbon atoms and including the methoxy, ethoxy, n-propoxy, isopropoxy, amoxy, octoxy, and analogous radicals.

Some of these compounds, however, have been found to have a high mammalian toxicity level that restricts their use as selective pesticides.

Therefore, the object of this invention is to provide such hydrazine-containing thiophosphates that retain their activity as insecticides and miticides but which are rendered much less toxic toward warm-blooded animals.

Novel pesticides of this invention correspond to the following structural formula:

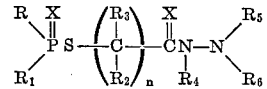

wherein R and $R_1$ may or may not be the same and are selected from the group consisting of $C_1$–$C_6$ alkoxy or alkyl, $C_1$–$C_6$ alkoxyalkyl, phenoxy optionally substituted by halogen, nitro or $C_1$–$C_6$ alkyl; phenylthio optionally substituted by halogen, nitro or $C_1$ to $C_6$ alkyl; $C_1$–$C_6$ alkylthio, branched and unbranched; phenyl optionally substituted by halogen, nitro or $C_1$–$C_6$ alkyl; $R_2$, $R_3$ and $R_4$ may or may not be the same and are selected from the group consisting of hydrogen; $C_1$–$C_6$ alkyl, unsubstituted, branched or unbranched or optionally substituted by halogen, $C_1$–$C_6$ alkoxy, $C_1$–$C_6$ alkylthio, $C_1$–$C_6$ alkylthioalkyl, $C_1$–$C_6$ alkoxyalkyl or mono and dialkylaminoalkyl; phenyl optionally substituted by halogen, nitro or $C_1$–$C_6$ alkyl; X is either O or S and $n$ is an integer ranging from 1–3; $R_5$ and $R_6$ may be the same or different and are selected from the group consisting of

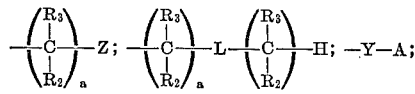

substituted and unsubstituted aryl and heteroaryl; wherein Z=CN, $COOR_2$, $CON(R_2)_2$, $NO_2$, $SO_2N(R_2)_2$, COOH, trihalomethyl,

wherein L=O, S, SO, $SO_2$, NH, $NR_2$,

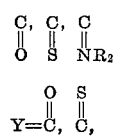

SO, $SO_2$, $A=OR_2$, $SR_2$, $NHR_2$, $N(R_2)_2$ and $a$ is an integer ranging from 1 to 6; with the proviso that when $R_5$ is the same as $R_2$, then $R_6$ cannot be $R_2$ except when $R_5$ or $R_6$ is aryl or heteroaryl.

It has been surprisingly discovered that when the $R_5$ and $R_6$ groups are limited to those groups set out hereinabove, the mammalian toxicity level of selective thiophosphate-S-acylated hydrazides is greatly reduced.

More particularly, it has been discovered that the specific compounds O,O'-dimethylphosphorothio - S - acetyl-2-methyl-2-(2-cyanoethyl) hydrazide and O,O'-dimethylphosphorothio-S-acetyl - 2 - methyl-2-(2-cyanopropyl)hydrazide have particularly low mammalian toxicity levels.

Specific examples of compounds coming within the scope of the above-defined generic structure are the following:

| Compound No. | Name | Structures |
|---|---|---|
| 1 | O,O'-diethylphosphorodithio-S-acetyl-2-methyl-2-(2-cyanoethyl)hydrazide. | $(C_2H_5O)_2\overset{S}{\overset{\|}{P}}SCH_2\overset{O}{\overset{\|}{C}}NHN\big<\!\!\!{}^{CH_3}_{CH_2CH_2CN}$ |
| 2 | O,O'-diethylphosphorothio-S-acetyl-2-methyl-2-(6-chloro-2-pyridyl)hydrazide. | $(C_2H_5O)_2\overset{O}{\overset{\|}{P}}SCH_2\overset{O}{\overset{\|}{C}}NHN\big<\!\!\!{}^{CH_3}_{\text{(6-chloro-2-pyridyl)}}$ |
| 3 | O,O'-diethylphosphorothio-S-acetyl-2-methyl-2-phenyl hydrazide. | $(C_2H_5O)_2\overset{O}{\overset{\|}{P}}SCH_2\overset{O}{\overset{\|}{C}}NHN\big<\!\!\!{}^{\phi}_{CH_3}$ |
| 4 | O,O'-dimethylphosphorothio-S-acetyl-2-methyl-2-(2-cyanoethyl)hydrazide. | $(CH_3O)_2\overset{O}{\overset{\|}{P}}SCH_2\overset{O}{\overset{\|}{C}}NHN\big<\!\!\!{}^{CH_3}_{CH_2CH_2CN}$ |
| 5 | O,O'-dimethylphosphorodithio-S-acetyl-2-methyl-2-(2-cyanoethyl)hydrazide. | $(CH_3O)_2\overset{S}{\overset{\|}{P}}SCH_2\overset{O}{\overset{\|}{C}}NHN\big<\!\!\!{}^{CH_3}_{CH_2CH_2CN}$ |
| 6 | O,O'-diethylphosphorothio-S-acetyl-2-methyl-2-(2-cyanopropyl)hydrazide | $(C_2H_5O)_2\overset{O}{\overset{\|}{P}}SCH_2\overset{O}{\overset{\|}{C}}NHN\big<\!\!\!{}^{CH_3}_{CH_2CH(CH_3)CN}$ |
| 7 | O,O'-diethylphosphorothio-S-acetyl-2-methyl-2-(2-carboethoxyethyl)hydrazide. | $(C_2H_5O)_2\overset{O}{\overset{\|}{P}}SCH_2\overset{O}{\overset{\|}{C}}NHN\big<\!\!\!{}^{CH_3}_{CH_2CH_2COOEt}$ |
| 8 | O,O'-diethylphosphorothio-S-acetyl-2-methyl-2-[2(N,N-dimethylcarboxamido)ethyl]hydrazide. | $(C_2H_5O)_2\overset{O}{\overset{\|}{P}}SCH_2\overset{O}{\overset{\|}{C}}NHN\big<\!\!\!{}^{CH_3}_{CH_2CH_2C(O)N(CH_3)_2}$ |
| 9 | O,O'-diethylphosphorothio-S-acetyl-2-methyl-2-(2-methylthioethyl)hydrazide. | $(C_2H_5O)_2\overset{O}{\overset{\|}{P}}SCH_2\overset{O}{\overset{\|}{C}}NHN\big<\!\!\!{}^{CH_3}_{CH_2CH_2SCH_3}$ |
| 10 | O,O'-diethylphosphorothio-S-acetyl-2-methyl-2-(2-ethoxyethyl)hydrazide. | $(C_2H_5O)_2\overset{O}{\overset{\|}{P}}SCH_2\overset{O}{\overset{\|}{C}}NHN\big<\!\!\!{}^{CH_3}_{CH_2CH_2OC_2H_5}$ |
| 11 | O,O'-diethylphosphorothio-S(3-propionyl)-2-methyl-2-(2-cyanoethyl)hydrazide. | $(C_2H_5O)_2\overset{O}{\overset{\|}{P}}SCH_2CH_2\overset{O}{\overset{\|}{C}}NHN\big<\!\!\!{}^{CH_3}_{CH_2CH_2CN}$ |
| 12 | O-ethyl-S-n-propylphosphorodithio-S-acetyl-2-methyl-2(2-cyanoethyl)hydrazide. | $\begin{matrix}C_2H_5O\\n\text{-}C_3H_7S\end{matrix}\!\!\overset{O}{\overset{\|}{P}}SCH_2\overset{O}{\overset{\|}{C}}NHN\big<\!\!\!{}^{CH_3}_{CH_2CH_2CN}$ |
| 13 | O,O'-diethylphosphorothio-S-acetyl-2-methyl-2-(2-cyanoethyl)hydrazide. | $(C_2H_5O)_2\overset{O}{\overset{\|}{P}}SCH_2\overset{O}{\overset{\|}{C}}NHN\big<\!\!\!{}^{CH_3}_{CH_2CH_2CN}$ |
| 14 | O,O'-diethylphosphorothio-S-(2-propionyl)-2-methyl-2(2-cyanoethyl)hydrazide. | $(C_2H_5O)_2\overset{O}{\overset{\|}{P}}SCH(CH_3)\overset{O}{\overset{\|}{C}}NHN\big<\!\!\!{}^{CH_3}_{CH_2CH_2CN}$ |
| 15 | O,O'-dimethylphosphorothio-S-acetyl-2-methyl-2-(2-cyanopropyl)hydrazide. | $(CH_3O)_2\overset{O}{\overset{\|}{P}}SCH_2\overset{O}{\overset{\|}{C}}NHN\big<\!\!\!{}^{CH_3}_{CH_2CH(CH_3)CN}$ |

TABLE—Continued

| Compound No. | Name | Structures |
|---|---|---|
| 16 | O,O'-diethylphosphorothio-S-acetyl-2-methyl-2-(3-cyano-2-propyl)hydrazide. | $(C_2H_5O)_2\overset{O}{\underset{\|}{P}}S\,CH_2\overset{O}{\underset{\|}{C}}NHN\diagdown\overset{CH_3}{\underset{CHCH_2CN}{\phantom{x}}}$ with CH$_3$ |
| 17 | O,O'-dimethylphosphorothio-S-acetyl-2-methyl-2-cyanomethyl hydrazide. | $(CH_3O)_2\overset{O}{\underset{\|}{P}}S\,CH_2\overset{O}{\underset{\|}{C}}NHN\diagdown\overset{CH_3}{\underset{CH_2CN}{\phantom{x}}}$ |
| 18 | O,O'-dimethylphosphorothio-S-acetyl-2-methyl-2-(3-cyano-2-propyl) hydrazide. | $(CH_3O)_2\overset{O}{\underset{\|}{P}}S\,CH_2\overset{O}{\underset{\|}{C}}NHN\diagdown\overset{CH_3}{\underset{CH-CH_2CN}{\phantom{x}}}$ with CH$_3$ |
| 19 | O,O'-diethylphosphorothio-S-(2-ethylthioacetyl)-2-methyl-2-(2-cyanoethyl)hydrazide. | $(C_2H_5O)_2\overset{O}{\underset{\|}{P}}S\,\underset{SC_2H_5}{CH}\overset{O}{\underset{\|}{C}}NHN\diagdown\overset{CH_3}{\underset{CH_2CH_2CN}{\phantom{x}}}$ |
| 20 | O,O'-dimethylphosphorothio-S-acetyl-2-methyl-2(2-ethoxyethyl)hydrazide. | $(CH_3O)_2\overset{O}{\underset{\|}{P}}S\,CH_2\overset{O}{\underset{\|}{C}}NHN\diagdown\overset{CH_3}{\underset{CH_2CH_2OC_2H_5}{\phantom{x}}}$ |
| 21 | O,O'-dimethylphosphorothio-S-acetyl-2-methyl-2-carbomethoxy hydrazide. | $(CH_3O)_2\overset{O}{\underset{\|}{P}}S\,CH_2\overset{O}{\underset{\|}{C}}NHN\diagdown\overset{CH_3}{\underset{COCH_3\,\|\,O}{\phantom{x}}}$ |
| 22 | O,O'-dimethylphosphorothio-S-acetyl-2-methyl-2-(N-phenylcarboxamido)hydrazide. | $(CH_3O)_2\overset{O}{\underset{\|}{P}}S\,CH_2\overset{O}{\underset{\|}{C}}NHN\diagdown\overset{CH_3}{\underset{CNH\phi\,\|\,O}{\phantom{x}}}$ |
| 23 | O,O'-dimethylphosphorothio-S-acetyl-2-methyl-2-(N-methylcarboxamido)hydrazide. | $(CH_3O)_2\overset{O}{\underset{\|}{P}}S\,CH_2\overset{O}{\underset{\|}{C}}NHN\diagdown\overset{CH_3}{\underset{CNHCH_3\,\|\,O}{\phantom{x}}}$ |
| 24 | O,O'-dimethylphosphorothio-S-acetyl-2-methyl-2-(carbothioethoxy)hydrazide. | $(CH_3O)_2\overset{O}{\underset{\|}{P}}S\,CH_2\overset{O}{\underset{\|}{C}}NHN\diagdown\overset{CH_3}{\underset{CSC_2H_5\,\|\,O}{\phantom{x}}}$ |
| 25 | O,O'-dimethylphosphorothio-S-acetyl-2-methyl-2-carboisopropoxy hydrazide. | $(CH_3O)_2\overset{O}{\underset{\|}{P}}S\,CH_2\overset{O}{\underset{\|}{C}}NHN\diagdown\overset{CH_3}{\underset{C-O-iPr\,\|\,O}{\phantom{x}}}$ |
| 26 | O-ethyl-ethylphosphonodithio-S-acetyl-1,2-dimethyl-2-(2-cyanoethyl)hydrazide. | $\underset{C_2H_5}{\overset{CH_3O}{\diagdown}}\overset{O}{\underset{\|}{P}}S\,CH_2\overset{O}{\underset{\|}{C}}\underset{CH_3}{N}N\diagdown\overset{CH_3}{\underset{CH_2CH_2CN}{\phantom{x}}}$ |

There are various ways for making one or more of the precursors required in forming the compounds of the subject invention.

STEP I

Process A.—Methyl hydrazine is reacted with an unsaturated cyanide compound according to the following schematic equation:

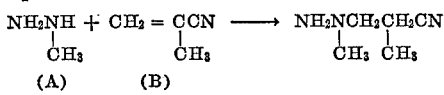

(A)   (B)

This type of reaction can be carried out at a temperature ranging from −20° to 80° C., preferably from 0° to 40° C., and a reaction time ranging from 1 to 48 hours, preferably from 4 to 12 hrs., with a mole ratio of A:B ranging from 2:1 to 5:1, preferably from 2:1 to 3:1. The solvents for this invention can be any ones selected from the group consisting of ether, methyl cyanide, chloroform, water and benzene. Preferably, the solvent is water.

Process B.—Another alternate method for forming these precursors is to react the methyl hydrazine with a chlorosubstituted pyridine compound according to the following schematic equation:

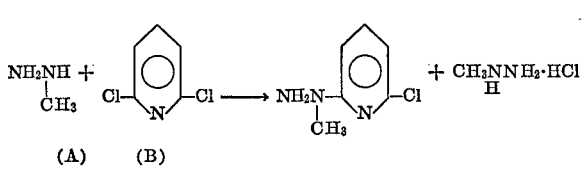

(A)   (B)

This type of reaction can be carried out at a temperature ranging from 20 to 150° C., preferably from 60 to 85° C., with a reaction time ranging from 2 to 72 hours, preferably from 12 to 24 hrs., and a mole ratio of A:B of 2:1 to 5:1, preferably from 2:1 to 3:1. The solvents for this reaction can be one selected from the group consisting of an alcohol such as ethanol, methanol and isopropanol.

Process C.—Yet another method for forming these precursors is to react the methyl hydrazine with a cyanomethyl benzene sulfonate compound according to the following schematic equation:

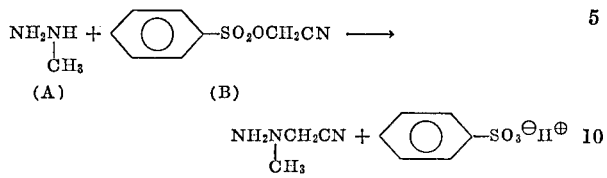

This type of reaction can be carried out at a temperature ranging from −20 to 100° C., preferably from 60 to 85°, and a reaction time ranging from 10 to 96 hours, preferably from 12 to 24 hrs. The solvents for this reaction can be any alcohol such as for example, methanol, ethanol, or isopropanol. The mole ratios of $A:B$ can range from 2:1 to 5:1, preferably from 2:1 to 3:1.

Process D.—A still further method for forming one of the precursors is to react the methyl hydrazine with 2-chloroethyl-ethyl ether according to the following schematic equation:

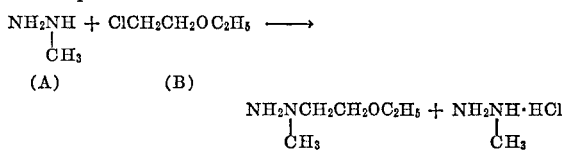

This type of reaction can be carried out at a temperature ranging from 20° to 200° C., preferably from 60 to 85° C., the reaction time ranging from 8 to 96 hours, preferably from 10 to 20 hrs., and the molar ratios of the reactants ($A:B$) ranging from 2:1 to 5:1, preferably from 2:1 to 3:1. The solvents can be any one selected from the group consisting of benzene, toluene and ethanol.

Process E.—A still further process for forming these precursors is to react the methyl hydrazine with ethyl-chlorothioformate according to the following schematic equation:

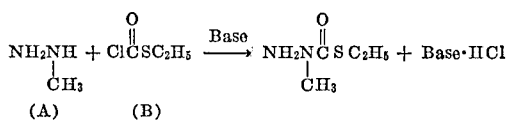

This type of reaction can be carried out at a temperature ranging from −59 to 100° C. and preferably from −10° to 10° C. and a reaction time ranging from 2 to 48 hours, preferably from 6 to 15 hrs., and at molar ratios of the reactants ($A:B$) ranging from 1:1 to 4:1, preferably from 1:1 to 2:1. The solvents for this reaction can be selected from the group consisting of methanol, ethanol, propanol, acetone and methylethyl ketone. This reaction is carried out in the presence of a base which can be one selected from the group consisting of an alkali metal hydroxide, such as sodium hydroxide and tertiary amines, such as triethylamine. The base acts as an acid acceptor in this reaction.

Process F.—Another method for forming these precursors for making the compounds of this invention is to react the methyl hydrazine with methyl isocyanate according to the following schematic equation:

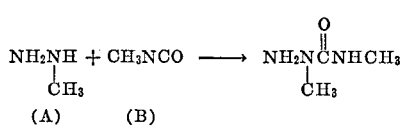

This type of reaction can be carried out at temperatures ranging from −20 to 50° C., preferably from −10 to 20° C., and reaction time ranging from 2 to 48 hours, preferably from 4 to 8 hrs., at a molar ratio of reactants of $A:B$ ranging from 1:1 to 4:1, preferably from 1:1 to 2:1. The solvents for this reaction can be selected from the group consisting of ether, benzene and toluene.

STEP II

Process A.—The second step in the process for making the compounds of the subject invention is to react any one of the precursors made according to the above-described procedures with a chloroacetic anhydride according to the following schematic equation:

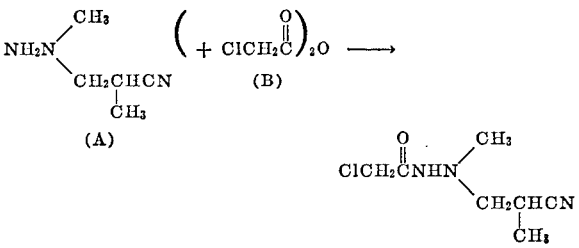

This type of reaction can be carried out at temperatures ranging from 0–150° C., preferably from 55 to 90° C., and at reaction times ranging from 2 to 48 hours, preferably from 8 to 16 hrs., and at molar ratios of $A:B$ ranging from 1:1 to 4:1, preferably from 1:1 to 2:1. The solvents for this reaction can be selected from the group consisting of ether, benzene and toluene.

Process B.—An alternative method for carrying out this Step II of the subject process can be to react any one of the precursors made according to the first step with a chloroacetyl chloride compound according to the following schematic equation:

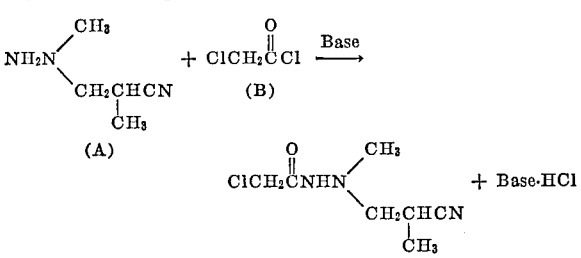

This type of reaction is carried out at a temperature ranging from −20 to 50° C., preferably from −10 to 20° C., the reaction time ranging from 1 to 48 hours, preferably from 3 to 8 hrs., and at molar ratios of $A:B$ ranging from 1:1 to 5:1, preferably from 1:1 to 2:1. The base for this reaction can be one selected from the group consisting of sodium hydroxide, triethylamine and other alkali metal hydroxides or tertiary amines such as tripropylamine, and the like. This base material acts as an acid acceptor. The solvents for this reaction can be selected from the group consisting of ether, benzene and toluene.

Process C.—A still further alternative method for carrying out Step II to give rise to branched analogs of the process is to react any one of the precursors made according to Step I of the process with a bromopropionyl bromide according to the following schematic equation:

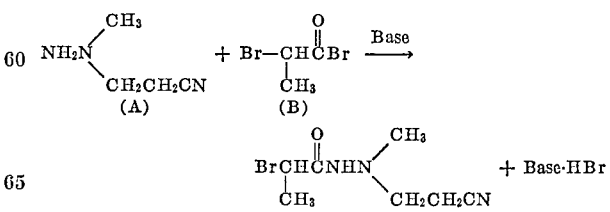

This type of reaction can be carried out at a temperature ranging from −30 to 60° C., preferably from −10 to 20° C., and a reaction time ranging from 2 to 48 hours, preferably 4 to 10 hrs., and the reactants are present in a molar ratio of $A:B$ ranging from 1:1 to 5:1, preferably from 1:1 to 2:1.

This type of reaction is carried out in the presence of a base which can be either an alkali metal hydroxide or a tertiary amine such as triethylamine. The solvents for this reaction are selected from the group consisting of ether, benzene and toluene.

Process D.—A still further alternative reaction for Step II to give rise to extended chain compounds is the reaction of any of the reactants of Step I with acrylyl chloride according to the following schematic equation:

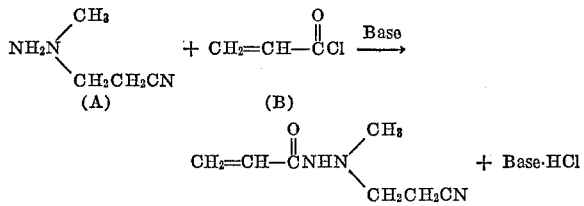

This type of reaction was carried out at a temperature ranging from −20 to 100° C., preferably from −10 to 20° C. at a reaction time ranging from 2 to 72 hours, preferably from 4 to 12 hrs., and a mole ratio of the reactants of $A:B$, ranging from 1:1 to 5:1. The reaction is carried out in the presence of a base, said base being either an alkali metal hydroxide or a tertiary amine, such as triethylamine. The solvents are any one selected from the group consisting of ether, tetrahydrofuran, benzene and toluene.

STEP III

Process A.—The final step in the preparation of these compounds can be schematically described as follows:

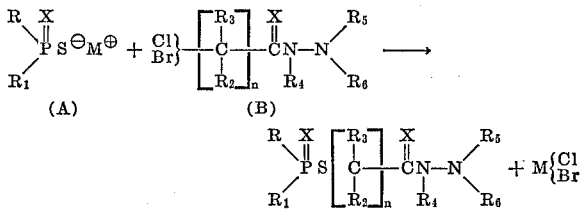

Wherein the reaction is carried out at a temperature ranging from −20 to 150° C., preferably from 40 to 70°, at a reaction time ranging from 2 to 72 hours, preferably from 4 to 12 hrs. The salt derivative (M) of the phosphorus acid is potassium, sodium, triethyl ammonium, ammonium, etc., salt. The solvents for this reaction can be selected from the group consisting of acetonitrile, benzene, acetone, tetrahydrofuran, toluene, dimethylformamide.

Process B.—An alternative procedure for this step in the overall synthesis can be described according to the following schematic equation:

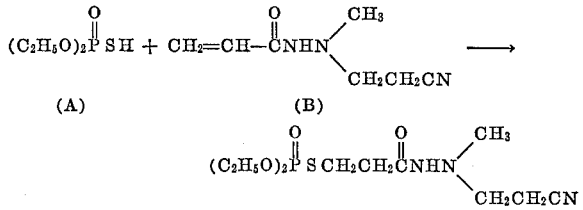

This type of reaction can be carried out at a temperature ranging from −10 to 100° C., preferably from 10 to 40° C., at a reaction time ranging from 2 to 48 hours, preferably from 4 to 12 hrs., and a mole ratio of $A:B$ ranging from 1:1 to 4:1, preferably from 1:1 to 2:1. The solvents for this reaction can be selected from the group consisting of methanol, ethanol and isopropanol.

The compounds of the invention have general insecticidal properties. They are especially useful in certain types of insect control.

Insecticidal compositions of the invention are prepared by admixing one or more of the active ingredients defined heretofore, in insecticidally effective amounts with a conditioning agent of the kind used and referred to in the art as a pest control adjuvant or modifier to provide formulations adapted for ready and efficient application to soil or plants using conventional applicator equipment.

Thus, the insecticidal compositions or formulations are prepared in the form of solids or liquids. Solid compositions are preferably in the form of granulars or dusts.

The compositions can be compounded to give homogeneous free-flowing dusts by admixing the active compound or compounds with finely divided solids preferably talc, natural clays, pyrophyllite, diatomaceous earth, or flours such as walnut shell, wheat, redwood, soya bean, and cottonseed flours. Other inert solid conditioning agents or carriers of the kind conventionally employed in preparing pest control compositions in powdered form can be used.

Granulars can be compounded by absorbing the compound in liquid form onto a preformed granular diluent. Such diluents as natural clays, pyrophyllite, diatomaceous earth, flours such as walnut shell, as well as granular sand can be employed.

In addition, granulars can also be compounded by admixing the active ingredient with one of the powdered diluents described hereinabove, followed by the step of either pelleting or extruding the mixture.

Liquid compositions of the invention are prepared in the usual way by admixing one or more of the active ingredient with a suitable liquid diluent medium. In the cases where the compounds are liquids, they may be sprayed in ultra low volume as such. With certain solvents, such as alkylated naphthalene or other aromatic petroleum solvents, dimethyl formamide, cycloketone, relatively high up to about 50% by weight or more concentration of the active ingredient can be obtained in solution.

The insecticidal compositions of the invention whether in the form of dusts or liquids, preferably also include a surface-active agent sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitute a desirable composition for application.

The surface-active dispersing agents employed can be of the anionic, cationic, or nonionic type and include, for example, sodium and potassium oleate, the amine salts of oleic acid, such as morpholine and dimethylamine oleates, the sulfonated animal and vegetable oils, such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and alkylphenol, polyvinyl alcohols, salts, such as the acetate of polyamines from reductive amination of ethylene/carbon monoxide polymers, laurylamine hydrochloride, laurylpyridinium bromide, stearyl trimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually, the minimum lower concentration will be 0.1%.

The insecticidal compositions are applied either as a spray, granular or a dust to the locus or area to be protected from undesirable insects. Such application can be made directly upon the locus or area and the plants thereon during the period of insect infestation in order to destroy the insects, but preferably, the application is made in advance of an anticipated insect infestation to prevent such infestation. Thus, the compositions can be applied as aqueous foliar sprays but can also be applied as sprays directly to the surface of the soil. Alternatively, the dry powdered compositions can be dusted directly on the plants or on the soil.

The active compound is, of course, applied in an amount sufficient to exert the desired insecticidal action. The amount of the active compound present in the compositions as actually applied for insect control will vary with the manner of application, the particular insects for which control is sought, the purpose for which the application is being made, and like variables. In general, the insecticidal compositions as applied in the form of a spray, dust or granular, will contain from about 0.1% to 100% by weight of the active compound.

Fertilizer materials, other insecticidal agents, and other pest control agents such as insecticides and fungicides can be included in the insecticidal compositions of the invention if desired.

The term "carrier" or "diluent" as used herein means a material, which can be inorganic or organic and synthetic or of natural origin, with which the active ingredient is mixed or formulated to facilitate its storage, transport, and handling and application to the plants to be protected. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals—although subsequently subjected to grinding, sieving, purification, and/or other treatments—including, for example, gypsum; tripolite; diatomaceous earth; mineral silicates such as mica, vermiculite, talc, and pyrophyllite; clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol, to neutralize this activity and thereby prevent possible decomposition of the derivatives.

For some purposes, a resinous or waxy carrier can be used, preferably one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax for example, beeswax or a mineral wax such as paraffin wax or montan wax, or a chlorinated mineral wax, or a microcrystalline wax such as those available under the registered trademark "Mikrovan Wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575° F., or boiling in the range of about 575° to about 1,000° F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e., deflocculating or suspending agent, and if desired, a finely divided solid carrier and/or a wetting agent. The active ingredient can be in particulate form or adsorbed on the carrier and preferably constitutes at least about 10%, more preferably at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely divided solid carrier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example, alcohols; ketones, especially acetone; ethers; hydrocarbons; etc.

Where the toxicant itself is a liquid these materials can be sprayed on crops or insects without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersion of the active ingredient in an organic liquid, preferably a water-insoluble organic liquid, containing an added emulsifying agent. These concentrates can also contain a proportion of water, for example, up to about 50% by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a nonaqueous phase.

The present invention is further illustrated in greater detail by the following examples, but it is to be understood that the present invention in its broadest aspects, is not necessarily limited in terms of the reactants, or specific temperatures, residence times, separation techniques and other process conditions, etc.; or dosage level, exposure times, test species used, etc. by which the compounds and/or compositions described and claimed are prepared and/or used.

EXAMPLE 1

Preparation of 1-methyl-1-(6-chloro-2-pyridyl) hydrazine (Step I, Process B)

Methylhydrazine (138.3 g., 3.0 moles) was added rapidly (10 min.) to a solution of 2,6-dichloropyridine (148 g., 1.0 mol) in a 1:1 ethanol-methanol (400 ml.), allowed to stir overnight and refluxed for 6 hours. The solvents were removed in vacuo to give an oil with 2 layers. The lower layer was distilled to yield a clear oil, B.P. 83–92° C., at 0.02–0.05 mm. Hg; 100 gms. (64%).

Analysis.—Calcd. for $C_6H_8ClN_3$ (percent): C, 45.7; H, 5.1; N, 26.7; Cl. 22.5. Found (percent): C, 45.9; H, 5.2; N, 26.1; Cl, 22.2.

Preparation of 1-methyl-1(6-chloro-2-pyridyl)-2-chloroacetyl hydrazide (Step II, Process B)

To a cooled solution of 1-methyl-1-(6-chloro-2-pyridyl) hydrazine (22.0 g., 0.14 mol) and triethylamine (14.2 g., 0.14 mol) in 100 ml. ether was added dropwise chloroacetyl chloride (15.9 g., 0.14 mol) over a 2 hour period. The mixture was allowed to stir at room temperature for 48 hours, filtered and washed with $H_2O$. Removal of the ether in vacuo gave 25.2 g. (77%) of the hydrazide, a small sample of which was recrystallized from EtOAc, M.P. 107–110°.

Analysis.—Calcd. for $C_8H_9Cl_2N_3O$ (percent): C, 41.0; H, 3.9; N, 17.9; Cl, 30.3. Found (percent): C, 41.6; H, 4.7; N, 17.4; Cl, 29.4.

Preparation of O,O'-diethylphosphorothio-S-acetyl - 2-methyl-2-(6-chloro-2-pyridyl)hydrazide (Compound 2) (Step III, Process A)

1-methyl-1(6-chloro-2-pyridyl)-2 - chloroacetyl hydrazide (14 g., 0.06 mol) and diethylphosphorothioic acid ammonium salt (11.6 g., 0.062 mol) were combined in 300 ml. $CH_3CN$ and refluxed for 2 hours. The reaction was filtered and evaporated in vacuo to yield a clear yellow oil which was distilled in vacuo to yield a dark viscous oil, 15.6 gm. (78%). Recrystallization from ether-pentane gave 14.7 g. (73%) of O,O'-diethylphosphoro-thio-S-acetyl-2-methyl-2-(6-chloro-2-pyridyl) hydrazide, M.P. 61.5– 63° C. The structure was confirmed by NMR.

Analysis.—Calcd. for $C_{12}H_{19}ClN_3O_4PS$ (percent): C, 39.2; H, 5.2; N, 11.4; Cl, 9.7; P, 8.4; S, 8.7. Found (percent): C, 39.6; H, 5.4; N, 11.5; Cl, 9.8; P, 8.3; S, 8.9.

EXAMPLE 2

Preparation of 1-methyl-1(2 cyanopropyl) hydrazine (Compound 15) (Step I, Process A)

A solution of 67 g. (1 mole) methacrylonitrile in 100 ml. methanol was added dropwise, rapidly, at room temperature to a solution of 46 g. (1 mol) methylhydrazine in 300 ml. methanol. After stirring overnight, there was no evidence of reaction and 200 ml. $H_2O$ was added in two portions. The temperature rose to 31°. The solution stirred for 48 hrs. and was evaporated in vacuo with ethanol being added to azeotrope the $H_2O$. The oil was vacuum distilled to give 59.3 g. (52%) of A: 53–57° at 0.05 mm. IR and NMR verified structure.

Analysis.—Calcd. for $C_5H_{11}N_3$ (percent): C, 53.1; H, 9.7; N, 37.2. Found (percent): C, 52.2; H, 9.4; N, 36.3.

Preparation of 1 - methyl-1-(2-cyanopropyl)-2-(2-chloroacetyl) hydrazide (Compound 15) (Step II, Process A)

A solution of 29.1 g. (0.17 mol) chloroacetic anhydride in 250 ml. benzene was added dropwise to a solution of A (19.3 g., 0.17 mol) in 50 ml. benzene. The temperature rose to 30° and the solution stirred overnight at room temperature. To this solution was added 100 ml. 5% $NaHCO_3$ solution. The layers were separated and the benzene layer washed with $H_2O$. The combined $H_2O$ layers were extracted with $CHCl_3$ and the $CHCl_3$ layers dried ($MgSO_4$) and evaporated in vacuo to give 20.7 g. (63%) B as a heavy oil. NMR and IR verified the structure. A small sample was recrystallized from ether-ethanol, M.P. 53–56.5°.

Analysis.—Calcd. for $C_7H_{12}ClN_3O$ (percent): C, 44.3; H, 6.3; N, 22.1. Found (percent): C, 44.5; H, 6.2; N, 21.9.

Preparation of 1(dimethylphosphorothioacetyl)-methyl-2(2-cyanopropyl) hydrazide (Compound 15 (Step III, Process A)

1-methyl-1(2-cyanopropyl)-2 - chloroacetyl hydrazide (15.2 g., 0.08 mol) and dimethyl phosphorothioic acid ammonium salt (12.9 g., 0.081 mol) were combined in 200 ml. $CH_3CN$ and heated at reflux (82°) for 5 hrs., cooled and allowed to stir at room temperature overnight. The $CH_3CN$ solution was decanted from the gummy solid and evaporated in vacuo to give a clear, colorless oil which was partitioned between $H_2O$ and ether. After ether extraction, the $H_2O$ layer was further extracted with benzene and the organic layers discarded (these washings remove $(CH_3O)_2P(O)SCH_3$). The water layer was extracted with $CHCl_3$ and EtOAc. The organic layers were dried ($MgSO_4$) and evaporated in vacuo to yield 14.2 g. (60%) of Compound 15 as a clear amber oil. The structure was confirmed by NMR (purity about 85%).

EXAMPLE 3

Preparation of 1-methyl-1(2-cyanoethyl) hydrazine (Compound 11) (Step I, Process A)

A solution of methyl hydrazine (46.1 g., 1 mol) in 200 ml. ether was added dropwise to a solution of acrylonitrile (53.1 g., 1 mol) in 200 ml. ether. The addition is controlled to keep the temperature between 5 and 15° C. and is then allowed to stir overnight at room temperature. The ether was removed in vacuo to give a clear, colorless oil which was distilled to give the desired product, B.P. 55–65° C. at 0.08–0.4 mm. Hg. The structure was verified by IR and NMR.

Preparation of 1-methyl-1(2-cyanoethyl)-2-acrylyl hydrazide (Compound 11) (Step II, Process D)

A solution of acrylyl chloride (45.3 g., 0.5 mol) in 100 ml. tetrahydrofuran was added to a cooled (−10° C.) solution of 1-methyl-1(2-cyanoethyl) hydrazine and triethylamine (51 g., 0.51 mol) in 200 ml. tetrahydrofuran. The reaction was stirred at room temperature overnight, filtered and evaporated in vacuo to give a yellow oil which was dissolved in CHCl$_3$ and washed with water, dried (MgSO$_4$) evaporated in vacuo. Cooling gave a yellow solid which was recrystallized from ether-ethyl acetate, M.P. 63.5–66°. The structure was confirmed by NMR.

*Analysis.*—Calcd. for C$_7$H$_{11}$N$_3$O (percent): C, 54.8; H, 7.2; N, 27.4. Found (percent): C, 54.5; H, 7.5; N, 27.2.

Preparation of 1[O,O - diethylphosphorothio-S(3-propionyl)]-2-methyl-2(2-cyanoethyl) hydrazide (Compound 11) (Step III, Process B)

Diethylmonothiophosphoric acid (25.5 g., 0.15 mol) was added in one portion to a suspension of 1-methyl-1(2-cyanoethyl)-2-acrylyl hydrazide (23 g., 0.15 mol) in 200 ml. benzene. The resulting solution was allowed to stir overnight, was warmed to 50° C. for 3 hrs. and allowed to stir at room temperature for 48 hrs. The benzene solution was washed with 5% NaHCO$_3$, water, dried (MgSO$_4$), evaporated in vacuo to give a viscous oil, whose NMR was consistent with the desired structure.

EXAMPLE 4

Preparation of 1 - methyl - 1(2-cyanoethyl)-2(2-chloroacetyl) hydrazide (Compound 19) (Step II, Process B)

A solution of chloroacetyl chloride (33.9 g., 0.3 mol) in 50 ml. ether was added dropwise to a cooled (−5 to −10° C.) solution of 1-methyl-1(2-cyanoethyl) hydrazine (29.7 g., 0.3 mol—see Example 3, Step I for preparation) and triethylamine (31 g., 0.3 mol) in 200 ml. ether over a period of 1.5 hrs. The mixture was stirred overnight at room temperature, filtered and the solid washed with water. The water washings were back extracted with ethyl acetate, dried (MgSO$_4$) and evaporated in vacuo. These solids were combined with the original water washed material to give 30 gms. (60%) of the hydrazide, m.p. 90–95°.

*Analysis.*—Calcd. for C$_6$H$_{10}$ClN$_3$O (percent): C, 41.0; H, 5.7; N, 23.8; Cl, 20.2. Found (percent): C, 41.5; H, 5.8; N, 22.6; Cl, 20.7.

Preparation of 1-methyl-1(2-cyanoethyl)-2(2-ethylthioacetyl) hydrazide (Compound 19)

Ethyl mercaptan (31.0 g., 0.5 mol) was added in one portion to a solution of sodium ethoxide in ethanol [prepared by the addition of sodium (11.5 g., 0.5 g.-atoms) to 300 ml. absolute ethanol]. 1-methyl-1(2-cyanoethyl) - 2(2 - chloroacetyl) hydrazide (87.8 g., 0.5 mol) was added in one portion to this solution and 250 ml. of ethanol were also added. The mixture was stirred for 24 hrs., filtered and the solvent removed in vacuo. The remaining oil was partitioned between CHCl$_3$ and water. The CHCl$_3$ layer was dried (MgSO$_4$) filtered and evaporated in vacuo to yield a tan solid which was recrystallized from ether-ethanol, M.P. 51–53°.

*Analysis.*—Calcd. for C$_8$H$_{15}$N$_3$OS (percent): C, 47.7; H, 6.9; N, 20.9; S, 15.9. Found (percent): C, 47.9; H, 7.6; N, 20.8; S, 16.8.

Preparation of O,O-diethylphosphorothio-S(2-ethylthioacetyl)-2-methyl - 2(2 - cyanoethyl) hydrazide (Compound 19) (Step III, Process A)

A solution of sulfuryl chloride (9.45 g., 0.07 mol) was added dropwise to a solution of 1 - methyl - 1(2 - cyanoethyl)-2(2-ethylthioacetyl) hydrazide (14.1 g., 0.07 mol) in 70 ml. CHCl$_3$. The solvent was removed in vacuo and the tan oily slurry is dissolved in 150 ml. CH$_3$CN to which was added diethylphosphorothioic acid ammonium salt (13.1 g., 0.07 mol) and heated at 81° C. for 3.5 hrs. The solvent was removed in vacuo and the resulting brown oil partitioned between H$_2$O and ether. The ether layer was discarded and the H$_2$O layer further extracted with CHCl$_3$ which was dried (MgSO$_4$), filtered and evaporated in vacuo to yield a dark brown oil. Thin Layer Chromatographic analysis on silica gel showed the presence of one major spot (Compound 19) with $R_f$=0.19 (ethyl acetate). The structure was confirmed by NMR.

EXAMPLE 5

Preparation of 1-methyl-1-carbomethoxy hydrazine (Compound 21) (Step I, Process E)

Methyl chloroformate (189 g., 2 mols) was added dropwise to a cooled (0° C.) solution sodium hydroxide (82.5 g., 2 mols) and methyl hydrazine (92 g., 2 mols) in 500 ml. ethanol. The mixture was stirred at room temperature for 1 hr., filtered and the solvent removed in vacuo to give a colorless oil which was distilled, B.P. 37–47° C. at 0.1 mm. Hg. NMR and IR confirmed the structure.

Preparation of 1 - methyl - 1 - carbomethoxy-2(2-chloroacetyl) hydrazide (Compound 21) (Step II, Process A)

In 3 portions, a solution of chloroacetic anhydride (102.6 g., 0.6 mol) in 600 ml. benzene was added to a solution of 1-methyl-1-carbomethoxy hydrazine (62.4 g., 0.6 mol) in 100 ml. benzene. The solution stirred at room temperature overnight, was neutralized with a saturated solution of sodium bicarbonate. The benzene layer was dried (MgSO$_4$), filtered and evaporated in vacuo to give a small amount of material. The water layer was submitted to liquid-liquid extraction with ethyl acetate. The EtOAc was dried (MgSO$_4$), filtered and evaporated to give a heavy oil. NMR and IR confirmed the structure.

Preparation of O,O - dimethylphosphorothio - S-acetyl-2-methyl - 2 - carbomethoxy hydrazide (Compound 21) (Step III, Process A)

1-methyl-1 - carbomethoxy - 2 - chloroacetyl hydrazide (18.1 g., 0.1 mol) and dimethylphosphorothioic acid ammonium salt (15.9 g., 0.1 mol) were combined in 100 ml. CH$_3$CN and heated to 60° C. for 3 hrs. and allowed to stir overnight at room temperature. The reaction was filtered and evaporated in vacuo to give an oil which was suspended in H$_2$O and extracted with CHCl$_3$. The CHCl$_3$ extracts were combined, dried (MgSO$_4$), filtered and evaporated in vacuo. The remaining oil was kept under high vacuum overnight. The structure was confirmed by NMR. Thin Layer Chromatographic analysis on silica gel showed the presence of one major spot (Compound 21) with $R_f$=0.19 (ethyl acetate).

EXAMPLE 6

Preparation of 2-methyl-4-phenyl semicarbazide
(Compound 22) (Step I, Process F)

A solution of phenyl isocyanate (119 g., 1.0 mol) in 100 ml. ether was added dropwise to a cooled (−30° C.) solution of methyl hydrazine (46 g., 1.0 mol) in 200 ml. ether. The mixture stirred overnight and the solid which formed was filtered and recrystallized from ethanol to give the product, M.P. 91–93° C.

*Analysis.*—Calcd. for $C_8H_{11}N_3O$ (percent): C, 58.5; H, 6.1; N, 25.6. Found (percent): C, 58.0; H, 6.9; N, 25.3.

Preparation of 1(2 - chloroacetyl) - 2 - methyl-4-phenyl semicarbazide (Compound 22) (Step II, Process A)

A solution of chloroacetic anhydride (34.2 g., 0.2 mol) in 150 ml. benzene was added in one portion to a solution of 2-methyl-4-phenyl semicarbazide (33.0 g., 0.2 mol) in 100 ml. benzene and allowed to stir at room temperature overnight. 100 ml. of a saturated solution of sodium bicarbonate was added and the solid which resulted removed by filtration and were recrystallized from ethyl acetate, M.P. 131–133°.

*Analysis.*—Calcd. for $C_{10}H_{12}ClN_3O_2$ (percent): C, 49.7; H, 4.9; N, 17.4; Cl, 14.7. Found (percent): C, 48.8; H, 5.4; N, 16.7; Cl, 15.0.

Preparation of 1(O,O-dimethylphosphorothio-S-acetyl)-2 - phenyl-2(N-phenylcarboxamido) hydrazide (compound 22) (Step III, Process A)

1 - chloroacetyl-2-methyl-4-phenyl semicarbazide (19.3 g., 0.08 mol) and dimethylphosphorothioic acid ammonium salt (13.0 g., 0.08 mol) were combined in 150 ml. acetonitrile and heated to 65° C. for 1.5 hrs., stirred overnight at room temperature, and heated to 65° for an additional 1.5 hrs. The reaction mixture was evaporated in vacuo and the white oil partitioned between 50 ml. water and 50 ml. ether. Three layers resulted. The ether layer was discarded. Chloroform (100 ml.) was added to the $H_2O$-oil mixture. The chloroform layer was collected and the $H_2O$ layer further washed with chloroform. The combined chloroform layers were dried ($MgSO_4$), filtered, evaporated in vacuo and subjected to high vacuum overnight. A clear, colorless gum resulted which was crystallized from ethanol, M.P. 112–115°. The structure was confirmed by NMR.

*Analysis.*—Calcd. for $C_{12}H_{18}N_3O_5PS$ (percent): C, 41.5; H, 5.2; N, 12.1; P, 8.9. Found (percent): C, 41.6; H, 5.4; N, 12.3; P, 8.9.

The following compounds were made according to the same procedure described hereinabove with the preceding examples:

EXAMPLE 7

Preparation of O,O'-diethylphosphorodithio-S-acetyl-2-methyl-2-(2-cyanoethyl) hydrazide (Compound 1)

1-methyl-1(2-cyanoethyl)-2-chloroacetyl hydrazide was reacted with diethyl phosphorodithioic acid ammonium salt to give a viscous oil which was identified as O,O'-diethylphosphorodithio-S-acetyl-2-methyl-2-(2-cyanoethyl) hydrazide. This structure was confirmed by NMR. The TLC* was (EtOAc) $R_f=0.54$.

EXAMPLE 8

Preparation of O,O'-diethylphosphorothio-S-acetyl-2-methyl-2-phenyl hydrazide (Compound 3)

1-methyl-1-phenyl-2-chloroacetyl hydrazide was reacted with diethylphosphorothioic acid ammonium salt to give ---
*TLC.—Thin Layer Chromatography (run on silica gel precoated slide).

a black oil which was identified as O,O'-diethylphosphorothio-S-acetyl-2-methyl-2-phenyl hydrazide. This structure was confirmed by NMR.

EXAMPLE 9

Preparation of O,O'-dimethylphosphorothio-S-acetyl-2-methyl-2(2-cyanoethyl)hydrazide (Compound 4)

1-methyl-1(2-cyanoethyl)-2-chloroacetyl hydrazide was reacted with dimethylphosphorothioic acid ammonium salt to give an amber oil which was identified as O,O'-dimethylphosphorothio-S-acetyl - 2-methyl-2-(2-cyanoethyl)hydrazide. This structure was confirmed by NMR.

EXAMPLE 10

Preparation of O,O'-dimethylphosphorodithio-S-acetyl-2-methyl-2-(2-cyanoethyl) hydrazide (Compound 5)

1-methyl-1(2-cyanoethyl)-2-chloroacetyl hydrazide was reacted with dimethylphosphorodithioic acid ammonium salt to give an amber oil which was identified as O,O'-dimethylphosphorodithio-S-acetyl - 2-methyl-2-(2-cyanoethyl) hydrazide. This structure was confirmed by NMR.

EXAMPLE 11

Preparation of O,O'-diethylphosphorothio-S-acetyl-2-methyl-2(2-cyanopropyl) hydrazide (Compound 6)

1 - methyl-1(2-cyanopropyl)-2-chloroacetyl hydrazide was reacted with diethylphosphorothioic acid ammonium salt to give an amber oil which was identified as O,O'-diethylphosphorothio - S - acetyl-2-methyl-2-(2-cyanopropyl) hydrazide. This structure was confirmed by NMR. The TLC was (10% EtOH/EtOAc) $R_f=0.15$.

EXAMPLE 12

Preparation of O,O'-diethylphosphorothio-S-acetyl-2-methyl-2-(2-carboethoxyethyl) hydrazide (Compound 7)

1 - methyl-1(2-carboethoxyethyl)-2-chloroacetyl hydrazide was reacted with diethylphosphorothioic acid ammonium salt to give a clear yellow oil which was identified as O,O' - diethylphosphorothio-S-acetyl-2-methyl-2-(2-carboethoxyethyl) hydrazide. This structure was confirmed by NMR. The TLC was (EtOAc) $R_f=0.24$.

EXAMPLE 13

Preparation of O,O' - diethylphosphorothio - S-acetyl-2-methyl-2[2(N,N - dimethylcarboxamido) ethyl]hydrazide (Compound 8)

1 - methyl - 1[2(N,N - dimethylcarboxamido)ethyl]-2-chloroacetyl hydrazide was reacted with diethylphosphorothioic acid ammonium salt to give an amber oil which was identified as O,O' - diethylphosphorothio-S-acetyl-2-methyl - 2[2(N,N-dimethylcarboxamido)ethyl]hydrazide. This structure was confirmed by NMR. The TLC was (20% EtOH/EtOAc) $R_f=0.17$.

EXAMPLE 14

Preparation of O,O'-diethylphosphorothio-S-acetyl-2-methyl-2(2-methylthioethyl)hydrazide (Compound 9)

1 - methyl-1(2-methylthioethyl)-2-chloroacetyl hydrazide was reacted with diethylphosphorothioic acid ammonium salt to give a tan oil which was identified as O,O'-diethylphosphorothio-S-acetyl - 2-methyl-2(2-methylthioethyl)hydrazide. This structure was confirmed by NMR. The TLC was (EtOAc) $R_f=0.23$.

EXAMPLE 15

Preparation of O,O'-diethylphosphorothio-S-acetyl-2-methyl-2-(2-ethoxyethyl) hydrazide (Compound 10)

1-methyl-1(2-ethoxyethyl)-2-chloroacetyl hydrazide was reacted with diethylphosphorothioic acid ammonium salt to give an orange oil which was identified as O,O'-diethylphosphorothio-S-acetyl - 2-methyl-2-(2-ethoxyethyl) hydrazide. This structure was confirmed by NMR. TLC was (EtOAc) $R_f=0.23$.

EXAMPLE 16

Preparation of O-ethyl - S - n - propylphosphorodithio-S-acetyl - 2 - methyl-2(2-cyanoethyl) hydrazide (Compound 12)

1-methyl-1(2-cyanoethyl)-2-chloroacetyl hydrazide was reacted with O - ethyl-S-n-propyl phosphorodithioic acid potassium salt to give an amber oil which was identified as O-ethyl-S-n-propylphosphorodithio-S-acetyl-2-methyl-2 (2-cyanoethyl)hydrazide. This structure was confirmed by NMR. The TLC was (EtOAc) $R_f=0.24$.

EXAMPLE 17

Preparation of O,O'-diethylphosphorothio-S(2-propionyl)-2-methyl-2(2-cyanoethyl) hydrazide (Compound 11)

1 - methyl-1(2-cyanoethyl)-2-acrylyl hydrazide was reacted with diethylphosphorothioic acid to give an amber oil which was identified as O,O'-diethylphosphorothio-S (2 - propionyl)-2-methyl-2(2-cyanoethyl) hydrazide. This structure was confirmed by NMR.

EXAMPLE 18

Preparation of O,O'-diethylphosphorothio-S-acetyl-2-methyl-2(3-cyano-2-propyl) hydrazide (Compound 16)

1-methyl-1(3-cyano-2-propyl)-2-chloroacetyl hydrazide was reacted with diethylphosphorothioic acid ammonium salt to give an orange oil which was identified as O,O'-diethylphosphorothio - S-acetyl-2-methyl-2(3-cyano-2-propyl)hydrazide. This was confirmed by NMR. The TLC was (10% EtOH/EtOAc) $R_f=0.32$.

EXAMPLE 19

Preparation of O,O'-dimethylphosphorothio-S-acetyl-2-methyl-2-cyanomethyl hydrazide (Compound 17)

1 - methyl-1-cyanomethyl-2-chloroacetyl hydrazide was reacted with dimethylphosphorothioic acid ammonium salt to give an amber oil which was identified as O,O'-dimethylphosphorothio-S-acetyl - 2-methyl-2-cyanomethyl hydrazide. This structure was confirmed by NMR. The TLC was (BZ/EtOAc 50/50) $R_f=0.94$.

EXAMPLE 20

Preparation of O,O'-dimethylphosphorothio-S-acetyl-2-methyl-2(3-cyano-2-propyl)hydrazide (Compound 18)

1-methyl-1(3-cyano - 2 - propyl) - 2 - chloroacetyl hydrazide was reacted with dimethylphosphorothioic acid ammonium salt to give an amber oil which was identified as O,O'-dimethylphosphorothio-S-acetyl - 2 - methyl-2(3-cyano-2-propyl)hydrazide. This structure was confirmed by NMR.

EXAMPLE 21

Preparation of O,O'-dimethylphosphorothio-S-acetyl-2-methyl-2(2-ethoxyethyl)hydrazide (Compound 20)

1-methyl-1(2-ethoxyethyl) - 2 -chloroacetyl hydrazide was reacted with dimethylphosphorothioic acid ammonium salt to give a black viscous oil which was identified as O,O'-dimethylphosphorothio-S-acetyl - 2 - methyl-2(2-ethoxyethyl)hydrazide. This structure was confirmed by NMR.

EXAMPLE 22

Preparation of O,O'-dimethylphosphorothio-S-acetyl - 2-methyl-2(N-methylcarboxamido)hydrazide (Compound 23)

1-methyl-1(N-methylcarboxamido) - 2 - chloroacetyl hydrazide was reacted with dimethylphosphorothioic acid ammonium salt to give a straw-colored viscous oil which was identified as O,O'-dimethylphosphorothio-S-acetyl-2-methyl - 2 - (N-methylcarboxamido)-hydrazide. This structure was confirmed by NMR.

EXAMPLE 23

Preparation of O,O'-dimethylphosphorothio-S-acetyl-2-methyl-2-carbothioethoxy hydrazide (Compound 24)

1-methyl - 1 - carbothioethoxy - 2 - chloroacetyl hydrazide was reacted with dimethylphosphorothioic acid ammonium salt to give a straw-colored oil which was identified as O,O'-dimethylphosphorothio - S - acetyl-2-carbothioethoxy hydrazide. This structure was confirmed by NMR.

EXAMPLE 24

Preparation of O,O'-dimethylphosphorothio-S-acetyl-2-methyl-2-carboisopropoxy hydrazide (Compound 25)

1-methyl-1-carboisopropoxy - 2 - chloroacetyl hydrazide was reacted with dimethylphosphorothioic acid ammonium salt to give an amber oil which was identified as O,O'-dimethylphosphorothio-S-acetyl - 2 - methyl-2-carboisopropoxy hydrazide. This structure was confirmed by NMR.

General experimental procedures for biological testing

In the examples which follow, the new thiophosphate esters were treated in the greenhouse and in the laboratory to determine their biological activity.

The experimental compounds were tested as aqueous emulsions. These emulsions were prepared by dissolving the compound in acetone and dispersing it in distilled water with Triton X–100, an alkylaryl polyether alcohol derived by the reaction of i-octyl phenol with ethylene oxide, to give spray emulsions containing the desired concentration of the compound. These emulsions were then used in standard laboratory tests described below.

Mexican bean beetle.—Bean leaves were dipped in the emulsion of the test chemical and allowed to dry. The individual treated leaves were placed in Petri dishes and five Mexican bean beetle larvae introduced into each of the two replicate dishes.

Mites, contact.—Potted bean plants infested with the two-spotted spider mites were placed on a turntable and sprayed with a formulation of the test chemical. The plants were held for seven days and the degree of mite control was rated after this period.

Mites, systemic.—Bean plants were treated by applying 20 ml. of the formulated test chemical to the soil. The mites were transferred to the plants after 24 hours. The plants were held for seven more days and the degree of mite control rated.

Aphid, contact.—Potted nasturtium plants infested with the bean aphids were placed on a turntable and sprayed with a formulation of the test chemical. The plants were held for two days and the degree of aphid control was rated.

Aphid, systemic.—Nasturtium plants were treated by applying 20 ml. of the formulated test chemical to the soil. The mites were transferred to the plants after 24 hours. The plants were held for 48 additional hours and the degree of the Aphid control rated.

Some of the compounds were also tested against other members of coleoptera order such as confused flour beetle and spider beetle, boll weevils as well as adult Mexican bean beetles. They were also tested for their effectiveness to control German cockroaches and pea aphids. Tests were also done to determine their ovicidal action, and were active against one or more of these species.

TABLE I.—PERCENT CONTROL AT 250 P.P.M.

| Compound | Mexican bean beetle | Mite contact adult | Mite contact nymph | Mite systemic adult | Mite systemic nymph | Bean aphid contact | Bean aphid systemic |
|---|---|---|---|---|---|---|---|
| O,O'-dimethylphosphorodithio-S-acetyl-2-methyl-2-(2-cyanoethyl) hydrazide (Cpd. 1) | 100 | 100 | 100 | 100 | 100 | 100 | 100 |
| O,O'-diethylphosphorothio-S-acetyl-2-methyl-2(6-chloro-2-pyridyl) hydrazide (Cpd. 2) | 100 | 90 | 90 | 40 | 0 | 90 | 0 |
| O,O'-diethylphosphorothio-S-acetyl-2-methyl-2-phenyl hydrazide (Cpd. 3) | 80 | 100 | 30 | 80 | 0 | 20 | 0 |
| O,O'-dimethylphosphorothio-S-acetyl-2-methyl-2-(2-cyanoethyl) hydrazide (Cpd. 4) | 100 | 100 | 100 | 100 | 100 | 100 | 100 |
| O,O'-dimethylphosphorodithio-S-acetyl-2-methyl-2(2-cyanoethyl) hydrazide (Cpd. 5) | 100 | 100 | 100 | 100 | 90 | 100 | 100 |
| O,O'-diethylphosphorothio-S-acetyl-2-methyl-2(2-cyanopropyl) hydrazide (Cpd. 6) | 100 | 100 | 100 | 100 | 100 | 100 | 100 |
| O,O'-diethylphosphorothio-S-acetyl-2-methyl-2-(2-carboethoxyethyl) hydrazide (Cpd. 7) | 100 | 100 | 100 | 90 | 80 | 90 | 70 |
| O,O'-diethylphosphorothio-S-acetyl-2-methyl-2[2(N,N-dimethylcarboxamide) ethyl] hydrazide (Cpd. 8) | 100 | 100 | 90 | 100 | 80 | 90 | 100 |
| O,O'-diethylphosphorothio-S-acetyl-2-methyl-2(2-methylthioethyl) hydrazide (Cpd. 9) | 100 | 100 | 100 | 90 | 80 | 90 | 100 |
| O,O'-diethylphosphorothio-S-acetyl-2-methyl-2(2-ethoxyethyl) hydrazide (Cpd. 10) | 100 | 100 | 100 | 100 | 100 | 100 | 100 |
| O,O'-diethylphosphorothio-S-(3-propionyl)-2-methyl-2(2-cyanoethyl) hydrazide (Cpd. 11) | 40 | 60 | 10 | 10 | 0 | 80 | 50 |
| O-ethyl-S-n-propylphosphorodithio-S-acetyl-2-methyl-2(2-cyanoethyl) hydrazide (Cpd. 12) | 100 | 100 | 100 | 100 | 80 | 90 | 100 |
| O,O'-diethylphosphorothio-S-acetyl-2-methyl-2(2-cyanoethyl) hydrazide (Cpd. 13) | 100 | 100 | 100 | 100 | 100 | 100 | 100 |
| O,O'-diethylphosphorothio-S(2-propionyl)-2-methyl-2(2-cyanoethyl) hydrazide (Cpd. 14) | 100 | 100 | 70 | 80 | 80 | 100 | 100 |
| O,O'-dimethylphosphorothio-S-acetyl-2-methyl-2(2-cyanopropyl) hydrazide (Cpd. 15) | 100 | 100 | 100 | 100 | 100 | 100 | 100 |
| O,O'-diethylphosphorothio-S-acetyl-2-methyl-2(3-cyano-2-propyl) hydrazide (Cpd. 16) | 100 | 100 | 100 | 100 | 90 | 60 | 90 |
| O,O'-dimethylphosphorothio-S-acetyl-2-methyl-2-cyanomethyl hydrazide (Cpd. 17) | 100 | 100 | 100 | 100 | 100 | 100 | 100 |
| O,O'-dimethylphosphorothio-S-acetyl-2-methyl-2(3-cyano-2-propyl) hydrazide (Cpd. 18) | 100 | 100 | 100 | 100 | 100 | 90 | 100 |
| O,O'-diethylphosphorothio-S-(2-ethylthioacetyl)-2-methyl-2(2-cyanoethyl) hydrazide (Cpd. 19) | 100 | 50 | 40 | 100 | 80 | 100 | 100 |
| O,O'-dimethylphosphorothio-S-acetyl-2-methyl-2(2-ethoxyethyl) hydrazide (Cpd. 20) | 100 | 100 | 100 | 100 | 100 | 0 | 80 |
| O,O'-dimethylphosphorothio-S-acetyl-2-methyl-2-carbomethoxy hydrazide (Cpd. 21) | 100 | 100 | 100 | 100 | 100 | 100 | 100 |
| O,O'-dimethylphosphorothio-S-acetyl-2-methyl-2(N-phenylcarboxamide) hydrazide (Cpd. 22) | 80 | 50 | 30 | 40 | 20 | 0 | 90 |
| O,O'-dimethylphosphorothio-S-acetyl-2-methyl-2(N-methylcarboxamide) hydrazide (Cpd. 23) | 100 | 100 | 100 | 100 | 100 | --- | 100 |
| O,O'-dimethylphosphorothio-S-acetyl-2-methyl-2(carbothioethoxy) hydrazide (Cpd. 24) | 100 | 100 | 100 | 100 | 100 | 100 | 100 |
| O,O'-dimethylphosphorothio-S-acetyl-2-methyl-2-carboisopropoxy hydrazide (Cpd. 25) | 100 | 100 | 95 | 100 | 100 | 100 | 90 |
| $(C_2H_5O)_2\overset{O}{\overset{\|}{P}}S\,CH_2\overset{O}{\overset{\|}{C}}NHN(CH_3)_2$ Belgian Patent (A). | 100 | 100 | 80 | 100 | 80 | 100 | 100 |
| $(C_2H_5O)_2\overset{O}{\overset{\|}{P}}S\,CH_2\overset{O}{\overset{\|}{C}}NHNH_2$ Belgian Patent (B). | 100 | 100 | 60 | 90 | 100 | 90 | 50 |
| $(CH_3O)_2\overset{O}{\overset{\|}{P}}S\,CH_2\overset{O}{\overset{\|}{C}}NHN(CH_3)_2$ Belgian Patent (C). | 0 | 70 | 30 | 90 | 70 | 90 | 50 |

It is to be noted that the insecticidal activity of O,O'-diethylphosphorothio - S - actyl - 2 - methyl-2-(2-cyanoethyl) hydrazide was compared to two of the compounds cited in the Belgiant Pat. 713,363. The biological activity is set forth forth in the following table.

From these determinations it is apparent that:
(1) In the parent structure

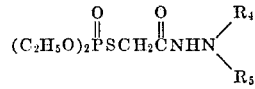

TABLE II

| | LD$_{50}$ (p.p.m.) [1] | | | | |
|---|---|---|---|---|---|
| Compound | Mexican bean beetle | Mite contact adult | Mite contact nymph | Mite systemic adult | Mite systemic nymph |
| $C_2H_5O)_2\overset{O}{\overset{\|}{P}}S\,CH_2\overset{O}{\overset{\|}{C}}NHN\begin{smallmatrix}CH_3\\CH_2CH_2CN\end{smallmatrix}$ Compound 11. | 3 | 1 | 1 | 3 | 7 |
| $(C_2H_5O)_2\overset{O}{\overset{\|}{P}}S\,CH_2\overset{O}{\overset{\|}{C}}NHN\begin{smallmatrix}CH_3\\CH_3\end{smallmatrix}$ Belgian Patent (A). | 4 | 5 | 4 | 6 | 6 |
| $(C_2H_5O)_2\overset{O}{\overset{\|}{P}}S\,CH_2\overset{O}{\overset{\|}{C}}NHNH_2$ | 31 | 80 | 180 | 135 | 58 |

[1] LD$_{50}$ (p.p.m.)—Rate in p.p.m. at which 50% of the insects in a test would be killed. For example, if 100% were killed at 250 p.p.m. and 0% at 50 p.p.m., the LD$_{50}$ would be 110 p.p.m. as determined on a log probit curve. The lower the numerical value, the more potent is the insecticidal and miticidal activity.

if $R_4$ and $R_5$ are hydrogen, activity is very poor (note high $LD_{50}$'s) $R_4$ and $R_5$ should be alkyl or substituted alkyl or other substituents than hydrogen.

(2) O,O'-diethylphosphorothio-S-acetyl - 2 - methyl-2-(2-cyanoethyl)hydrazide and Belgian Patent (A), within limits of error are equally active and very potent.

It was further found that the acute oral toxicity to rats of O,O'-diethylphosphorothio-S-acetyl - 2 - methyl-2-(2-cyanoethyl)hydrazide and Belgian Patent (A) is virtually equal.

O,O' - diethylphosphorothio-S-acetyl-
2 - methyl - 2 - (2 - cyanoethyl)
hydrazide _____ $LD_{50}$=1.5 mg./kg.
Belgian Patent (A) _____ $LD_{50}$=2.1 mg./kg.

Variation of the phosphate portion resulted in the realization that the dimethyl monothiophosphate moiety $$\left[ (CH_3O)_2\overset{O}{\underset{\|}{P}}S- \right]$$

lends the proper balance of toxicity and insecticidal activity (Compounds 4 and 15, Table III) to the compounds claimed in this patent while the corresponding analog (Belgian Patent C, Table III) of the aforementioned patent is very inactive.

O,O'-diethylphosphorothio-S-acetyl-2-methyl-2-(2-ethoxyethyl)hydrazide,
O,O'-diethylphosphorothio-S-(3-propionyl)-2-methyl-2-(2-cyanoethyl)hydrazide,
O-ethyl-S-n-propylphosphorodithio-S-acetyl-2-methyl-2-(2-cyanoethyl)hydrazide,
O,O'-diethylphosphorothio-S-acetyl-2-(2-cyanoethyl)hydrazide,
O,O'-diethylphosphorothio-S-(2-propionyl)-2-methyl-2-(2-cyanoethyl)hydrazide,
O,O'-dimethylphosphorothio-S-acetyl-2-methyl-2-(2-cyanopropyl)hydrazide,
O,O'-diethylphosphorothio-S-acetyl-2-methyl-2-(3-cyano-2-propyl)hydrazide,
O,O'-dimethylphosphorothio-S-acetyl-2-methyl-2-cyanomethylhydrazide,
O,O'-dimethylphosphorothio-S-acetyl-2-methyl-2-(3-cyano-2-propyl)hydrazide
O,O'-diethylphosphorothio-S-(2-ethylthioacetyl)-2-methyl-2-(cyanoethyl)hydrazide,
O,O'-dimethylphosphorothio-S-acetyl-2-methyl-2-(2-ethoxyethyl)hydrazide.
O,O'-dimethylphosphorothio-S-acetyl-2-methyl-2-carbomethoxyhydrazide,

TABLE III

| Compound | LD₅₀ (p.p.m.) | | | | |
|---|---|---|---|---|---|
| | Mexican bean beetle | Mite contact adult | Mite contact nymph | Mite systemic adult | Mite systemic nymph |
| Compound 4. 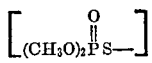 | 5 | 4 | 10 | 5 | 4 |
| Compound 15. | 3 | 2 | 3 | 2 | 3 |
| Belgian Patent (C). | >250 | 130 | >250 | 80 | 130 |

It was further found that Belgian Patent C decomposed fairly rapidly upon standing whereas the compounds claimed in this patent are indeed stable and retain their activity.

It was found that Compound 4 had an acute oral toxicity of >46.4 mg./kg. and Compound 15 was 100 mg./kg. These values make the compounds more useful as insecticides.

What is claimed is:
1. A compound selected from the group consisting of
O,O'-diethylphosphorodithio-S-acetyl-2-methyl-2-(2-cyanoethyl)-hydrazide,
O,O'-diethylphosphorothio-S-acetyl-2-methyl-2-phenyl-hydrazide,
O,O'-dimethylphosphorothio-S-acetyl-2-methyl-2-(2-cyanoethyl)-hydrazide,
O,O'-dimethylphosphorodithio-S-acetyl-2-methyl-2-(2-cyanoethyl)hydrazide,
O,O'-diethylphosphorothio-S-acetyl-2-methyl-2-(2-cyanopropyl)hydrazide,
O,O'-diethylphosphorothio-S-acetyl-3-methyl-2-(2-carboethoxyethyl)hydrazide,
O,O'-diethylphosphorothio-S-acetyl-2-methyl-2-[2-(N,N-dimethylcarboxamido)ethyl]hydrazide.
O,O'-diethylphosphorothio-S-acetyl-2-methyl-2-(2-methylthioethyl)hydrazide,
O,O'-dimethylphosphorothio-S-acetyl-2-methyl-2-(N-phenylcarboxamido)hydrazide,
O,O'-dimethylphosphorothio-S-acetyl-2-methyl-2-(N-methylcarboxamido)hydrazide,
O,O'-dimethylphosphorothio-S-acetyl-2-methyl-2-(carbothioethoxy)hydrazide,
O,O'-dimethylphosphorothio-S-acetyl-2-methyl-2-carboisopropoxy hydrazide, and
O-ethylphosphonodithio-S-acetyl-1,2-dimethyl-2-(2-cyanoethyl)hydrazide.

2. A compound according to claim 1, which is O,O'-dimethylphosphorothio-S-acetyl - 2 - methyl - 2(2 - cyanoethyl) hydrazide.

3. A compound according to claim 1, which is O,O'-dimethylphosphorothio-S-acetyl - 2 - methyl-2-(2-cyanopropyl) hydrazide.

4. A compound according to claim 1, which is O,O'-diethylphosphorothio-S(2-ethylthioacetyl) - 2 - methyl-2 (2-cyanoethyl hydrazide.

5. A compound according to claim 1, which is O,O'-dimethylphosphorothio-S-acetyl-2-methyl - 2 - carbomethoxy hydrazide.

6. A compound according to claim 1, which is O,O'-dimethylphosphorothio-S-acetyl - 2 - methyl-2(N-phenylcarboxamido) hydrazide.

7. A compound according to claim 1, which is O,O'-dimethylphosphorothio-S-acetyl - 2 - methyl-2(N-methylcarboxamido) hydrazide.

8. A compound according to claim 1, which is O,O'-dimethylphosphorothio-S-acetyl - 2 - methyl-2-carboisopropoxy hydrazide.

9. A compound according to claim 1, which is O,O'-diethylphosphorothio-S-acetyl - 2 - methyl - 2 - phenyl hydrazide.

10. A compound according to claim 1, which is O,O'-diethylphosphorothio - S - acetyl-2-methyl - 2(2-cyanopropyl) hydrazide.

11. A compound according to claim 1, which is O,O'-dimethylphosphorothio - S - acetyl - 2 - methyl-2-cyanomethyl hydrazide.

12. A compound according to claim 1, which is O,O'-dimethylphosphorothio - S - acetyl-2-methyl-2(2-ethoxyethyl) hydrazide.

References Cited
UNITED STATES PATENTS 3,518,327   6/1970   Fearing _____ 260—923

LEWIS GOTTS, Primary Examiner

A. H. SUTTO, Assistant Examiner

U.S. Cl. X.R.

260—294.8 K, 455 P, 465.4, 465.5; 424—211